United States Patent
Saito et al.

(10) Patent No.: US 7,657,343 B2
(45) Date of Patent: Feb. 2, 2010

(54) ASSEMBLING SYSTEM, ASSEMBLING UNIT, LAYOUT ARRANGING SYSTEM AND LAYOUT ARRANGING METHOD

(75) Inventors: Katsuo Saito, Tokyo (JP); Motoyasu Ohata, Tokyo (JP)

(73) Assignee: Hirata Corporation, Shinagawa-Ku, Tokyo (JP)

( * ) Notice: Subject to any disclaimer, the term of this patent is extended or adjusted under 35 U.S.C. 154(b) by 517 days.

(21) Appl. No.: 11/292,005

(22) Filed: Dec. 2, 2005

(65) Prior Publication Data
US 2006/0080827 A1 Apr. 20, 2006

Related U.S. Application Data

(63) Continuation of application No. PCT/JP03/07150, filed on Jun. 5, 2003.

(51) Int. Cl.
*G06F 7/00* (2006.01)
(52) U.S. Cl. ....................... 700/230; 700/213
(58) Field of Classification Search .......... 700/213, 700/230, 214; 198/418.1, 418
See application file for complete search history.

(56) References Cited

U.S. PATENT DOCUMENTS 4,209,898 A * 7/1980 Aoki et al. ............... 29/783
6,076,652 A * 6/2000 Head, III ............... 198/341.07
2003/0083768 A1* 5/2003 Duemler ................. 700/108

FOREIGN PATENT DOCUMENTS

| JP | 06-206151 | 7/1994 |
|---|---|---|
| JP | 06-348769 | 12/1994 |
| JP | 07-160739 | 6/1995 |
| JP | 07-225614 | 8/1995 |
| JP | 2000-039905 | 2/2000 |
| JP | 2000-117594 | 4/2000 |
| JP | 2001-236110 | 8/2001 |
| JP | 2002-120927 | 4/2002 |

* cited by examiner

*Primary Examiner*—Gene Crawford
*Assistant Examiner*—Ramya Prakasam
(74) *Attorney, Agent, or Firm*—Buchanan Ingersoll & Rooney PC

(57) ABSTRACT

A layout arranging system doing automatic layout of a system being constituted of assembling units. More particularly, a layout arranging system (102) communicable with a plurality of connectable conveyors (C/V 1-12), comprising a module for recognizing connected conveyors (C/V 1-12), a module for acquiring information concerning recognized conveyors (C/V 1-12), and a module for laying out the recognized conveyors (C/V 1-12).

9 Claims, 20 Drawing Sheets

FIG. 2

| TYPE | CONVEYING DIRECTION 201 | CONNECTION POSITION 202 | DRIVING COUNT 203 | USE 204 |
|---|---|---|---|---|
| A | 201-1 (circle with arrows in all directions, atop rectangle with upward arrow) | CN1, CN2, CN3, CN4 (circular hub with four connectors) | 1 \| 2 \| 3 \| ④ | FOR LOADING C/V CONNECTION |
| B | rectangle with upward arrow | CN1, CN2 | 1 \| 2 \| 3 \| 4 | EXTENSION C/V |
| C | rectangle with upward arrow | CN1, CN2 | 1 \| 2 \| 3 | EXTENSION C/V |
| D | rectangle with upward arrow, 201-2 (circle with arrows in all directions below) | CN1, CN2, CN3, CN4 (circular hub with four connectors) | ① \| 2 \| 3 \| 4 | FOR UNLOADING C/V CONNECTION |

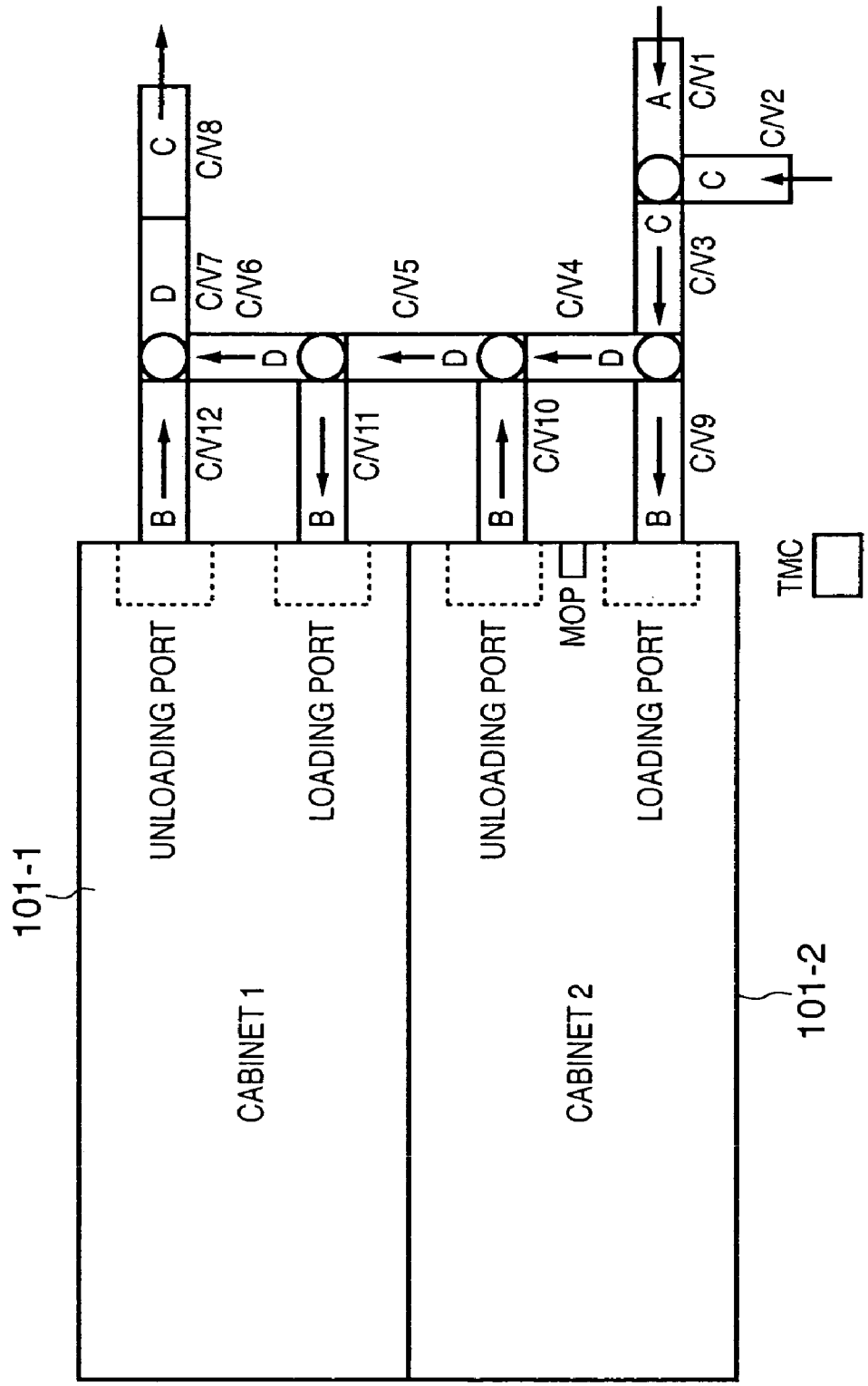

FIG. 10

| BASIC UNIQUE INFORMATION OF UNIT |
|---|
| 1001 — Link Node No :#02 |
| 1002 — MACHINE TYPE :   A |

FIG. 12

| FIELD | DATA RANGE | EXAMPLE) C/V ID 01 | EXAMPLE) C/V ID 32 | EXAMPLE) C/V ID 63 |
|---|---|---|---|---|
| C/V ID | 01~93 | 1 | 32 | 63 |
| SYSTEM | 1, 2, 3 | 1 | 2 | 3 |
| C/V No | 01~31 | 1 | 1 | 1 |
| PRESENCE/ABSENCE | 0 : ABSENT<br>1 : PRESENT | | | |
| C/V Type | A :<br>B :<br>C :<br>D : | A | B | A |
| ROTATION DIRECTION | 1 : FORWARD ROTATION<br>2 : REVERSE ROTATION<br>3 : FORWARD/REVERSE ROTATION | 1 | 1 | 2 |
| CONNECTION TARGET (C/V ID) | CONNECTION POSITION FF  01~93<br>CONNECTION POSITION FL  01~93<br>CONNECTION POSITION FR  01~93<br>CONNECTION POSITION BB  01~93<br>CONNECTION POSITION BL  01~93<br>CONNECTION POSITION BR  01~93 | 02 | 03 | 02 |
| APPLICATION PURPOSE | 0 : NORMAL C/V<br>1 : CABINET LOADING C/V<br>2 : CABINET UNLOADING C/V<br>3 : LOADING C/V<br>4 : UNLOADING C/V<br>5 : ABNORMAL C/V | 1 | 0 | 2 |
| CABINET (LOADING C/V AND UNLOADING C/V) | 01~10 | 01 | 01 | 01 |

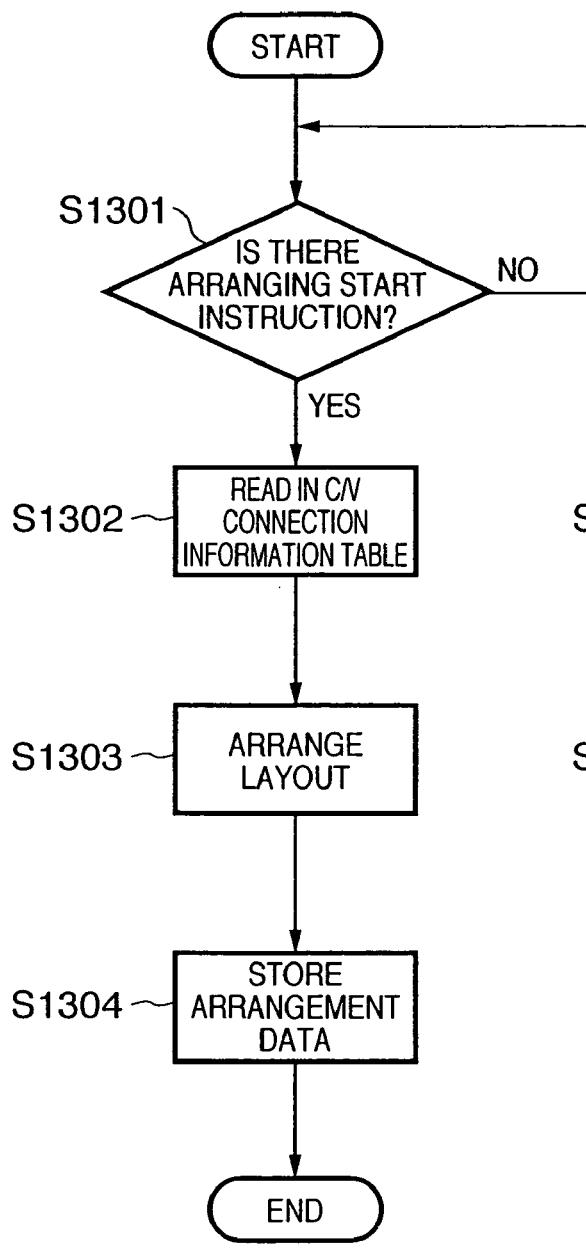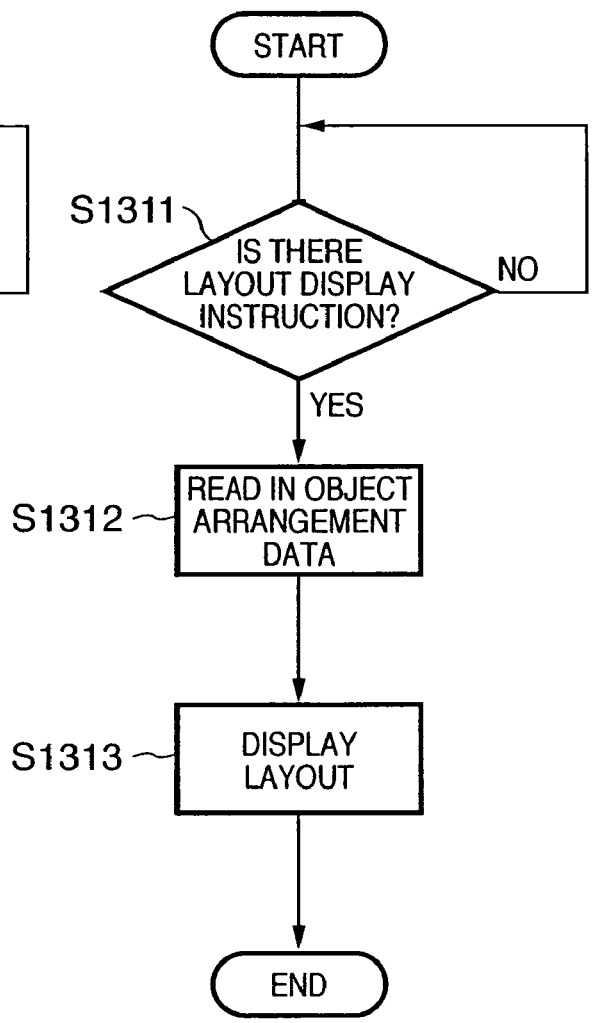

FIG. 14A

| CONNECTION TARGET C/V | | | CONNECTING C/V | | | | |
|---|---|---|---|---|---|---|---|
| C/V TYPE | DISPLAY DIRECTION | CONNECTION POSITION | C/V TYPE | CONNECTION POSITION | CONNECTION POSITION ON A SCREEN | Top POSITION CALCULATION | LeftTop POSITION CALCULATION |
| A | VERTICAL POSITION ON FF | FF | A | FF | VERTICAL | TARGET Top + SELF Height | TARGET Left |
| | | | | BB | VERTICAL | TARGET Top + SELF Height | TARGET Left |
| | | | | FL | HORIZONTAL | TARGET Top + SELF Height | TARGET Left |
| | | | | FR | HORIZONTAL | TARGET Top + SELF Height | TARGET Left - (SELF width - TARGET width) |
| | | | B | FF | VERTICAL | TARGET Top + SELF Height | TARGET Left |
| | | | | BB | VERTICAL | TARGET Top + SELF Height | TARGET Left |
| | | | | FL | HORIZONTAL | TARGET Top + SELF Height | TARGET Left |
| | | | | FR | HORIZONTAL | TARGET Top + SELF Height | TARGET Left - (SELF width - TARGET width) |
| | | | | BL | HORIZONTAL | TARGET Top + SELF Height | TARGET Left - (SELF width - TARGET width) |
| | | | | BR | HORIZONTAL | TARGET Top + SELF Height | TARGET Left |
| | | | C | FF | VERTICAL | TARGET Top + SELF Height | TARGET Left |
| | | | | BB | VERTICAL | TARGET Top + SELF Height | TARGET Left |
| | | | D | FF | VERTICAL | TARGET Top + SELF Height | TARGET Left |
| | | | | BB | VERTICAL | TARGET Top + SELF Height | TARGET Left |
| | | | E | FF | VERTICAL | TARGET Top + SELF Height | TARGET Left |
| | | | | BB | VERTICAL | TARGET Top + SELF Height | TARGET Left |

FIG. 14B

| CONNECTION TARGET C/V | | | CONNECTING C/V | | | | |
|---|---|---|---|---|---|---|---|
| C/V TYPE | DISPLAY DIRECTION | CONNECTION POSITION | C/V TYPE | CONNECTION POSITION | CONNECTION POSITION ON A SCREEN | Top POSITION CALCULATION | LeftTop POSITION CALCULATION |
| A | VERTICAL POSITION ON FF | BB | A | FF | VERTICAL | TARGET Top – SELF Height | TARGET Left |
| | | | | BB | VERTICAL | TARGET Top – SELF Height | TARGET Left |
| | | | | FL | HORIZONTAL | TARGET Top – SELF Height | TARGET Left – (SELF width – TARGET width) |
| | | | | FR | HORIZONTAL | TARGET Top – SELF Height | TARGET Left |
| | | | B | FF | VERTICAL | TARGET Top – SELF Height | TARGET Left |
| | | | | BB | VERTICAL | TARGET Top – SELF Height | TARGET Left |
| | | | | FL | HORIZONTAL | TARGET Top – SELF Height | TARGET Left – (SELF width – TARGET width) |
| | | | | FR | HORIZONTAL | TARGET Top – SELF Height | TARGET Left |
| | | | | BL | HORIZONTAL | TARGET Top – SELF Height | TARGET Left |
| | | | | BR | HORIZONTAL | TARGET Top – SELF Height | TARGET Left – (SELF width – TARGET width) |
| | | | C | FF | VERTICAL | TARGET Top – SELF Height | TARGET Left |
| | | | | BB | VERTICAL | TARGET Top – SELF Height | TARGET Left |
| | | | D | FF | VERTICAL | TARGET Top – SELF Height | TARGET Left |
| | | | | BB | VERTICAL | TARGET Top – SELF Height | TARGET Left |
| | | | E | FF | VERTICAL | TARGET Top – SELF Height | TARGET Left |
| | | | | BB | VERTICAL | TARGET Top – SELF Height | TARGET Left |

ASSEMBLING SYSTEM, ASSEMBLING UNIT, LAYOUT ARRANGING SYSTEM AND LAYOUT ARRANGING METHOD

TECHNICAL FIELD

The present invention relates to a layout arranging technique for an assembling system comprising assembling units.

BACKGROUND ART

In general, in constructing a system, there is known a method of constructing one whole system by combining a plurality of units classified according to functions.

Consider, for example, a logistics system in a factory. A whole logistics system is constructed by using a plurality of unit convey apparatuses. The unit convey apparatuses have functions which differ in conveying direction, the presence/absence and position of a rotating table, apparatus length, and the like according to uses. A flexible logistics system (assembling system) can be realized by freely combining them (see, for example, Japanese Patent Laid-Open No. 2002-120927).

Each assembled unit is managed by a conveyance controller which manages overall logistics. A user inputs a layout indicating the arrangement of the respective units to the conveyance controller on the basis of a final assembled state. The conveyance controller then monitors the logistics system on the basis of the input layout, and makes a logistics plan (a convey route, conveyance timing, and the like for each product to be conveyed) on the basis of the layout. Each unit performs conveyance control on the basis of a convey instruction output by the conveyance controller in accordance with the logistics plan.

When one whole system is constructed by combining a plurality of units in this manner, it is important for monitoring/controlling of the overall system to accurately and quickly arrange a layout representing the assembled state of each unit.

Conventionally, however, the user must check a finally assembled logistics system and arrange a layout by input operation by himself/herself upon each check. For this reason, a heavy burden is placed on the user.

Whenever the mount position of each unit is changed or each unit is dismounted/mounted along with a change in logistics or factory layout, the user needs to modify the layout, resulting in cumbersome operation.

In addition, even a simple layout cannot be easily arranged/changed without requesting the program creation technician who has created a program.

DISCLOSURE OF INVENTION

The present invention has been made in consideration of the above problems, and has as its object to easily arrange the layout of an assembling system comprising assembling units.

In order to solve the above problems, for example, an assembling system according to the present invention has the following arrangement.

There is provided an assembling system comprising a plurality of connectable assembling units and a controller which controls the assembling units, the assembling unit comprising identification information transmission means for, when another assembling unit is connected, transmitting identification information of the other assembling unit to the controller, and connection information transmission means for transmitting information concerning connection of the assembling unit to the controller on the basis of an instruction from the controller, and the controller comprising identification means for identifying the other assembling unit on the basis of the transmitted identification information, connection information reception means for receiving information concerning connection of the assembling unit, and arranging means for arranging a layout between the assembling unit and the identified other assembling unit on the basis of the information concerning the connection.

In addition, in order to solve the above problems, for example, an assembling unit according to the present invention has the following arrangement.

There is provided an assembling unit which can communicate with a controller capable of arranging a layout and can be connected to another assembling unit, comprising identification information transmission means for, when another assembling unit is connected, transmitting identification information of the other assembling unit to the controller; and connection information transmission means for transmitting information concerning connection of the assembling unit to the controller on the basis of an instruction from the controller.

Furthermore, in order to solve the above problems, for example, a layout arranging system according to the present invention has the following arrangement.

There is provided a layout arranging system which can communicate with a plurality of connectable assembling units, comprising:

recognition means for recognizing the assembling units which are connected;

acquisition means for acquiring information concerning an assembled state of the recognized assembling units; and arranging means for arranging a layout of the recognized assembling units on the basis of the acquired information concerning the assembled state.

BRIEF DESCRIPTION OF DRAWINGS

The features and advantages of the present invention will be fully understood from the following detailed description of the preferred embodiments and the accompanying drawings.

FIG. 2 is a view showing a list of the types of convey units constituting a convey system (C/V information table);

FIG. 3A is a plan view showing the arrangement of C/Vs of the respective types (A to D) shown in FIG. 2 when the convey system shown in FIG. 1 is constructed by using the C/Vs of the respective types;

FIG. 10 is a view showing an example of unique information of a C/V;

FIG. 12 is a view showing an example of a C/V connection information table;

FIGS. 13A and 13B are flowcharts showing the flows of layout arrangement processing and layout display processing in the layout arranging system according to an embodiment of the present invention;

FIGS. 14A and 14B are views showing C/V display formulas used for layout arrangement processing in the layout arranging system according to an embodiment of the present invention;

BEST MODE FOR CARRYING OUT THE INVENTION

The preferred embodiments of the present invention will be described in detail below with reference to the accompanying drawings.

First Embodiment

[1. Outline of Convey System]

Figure 1:
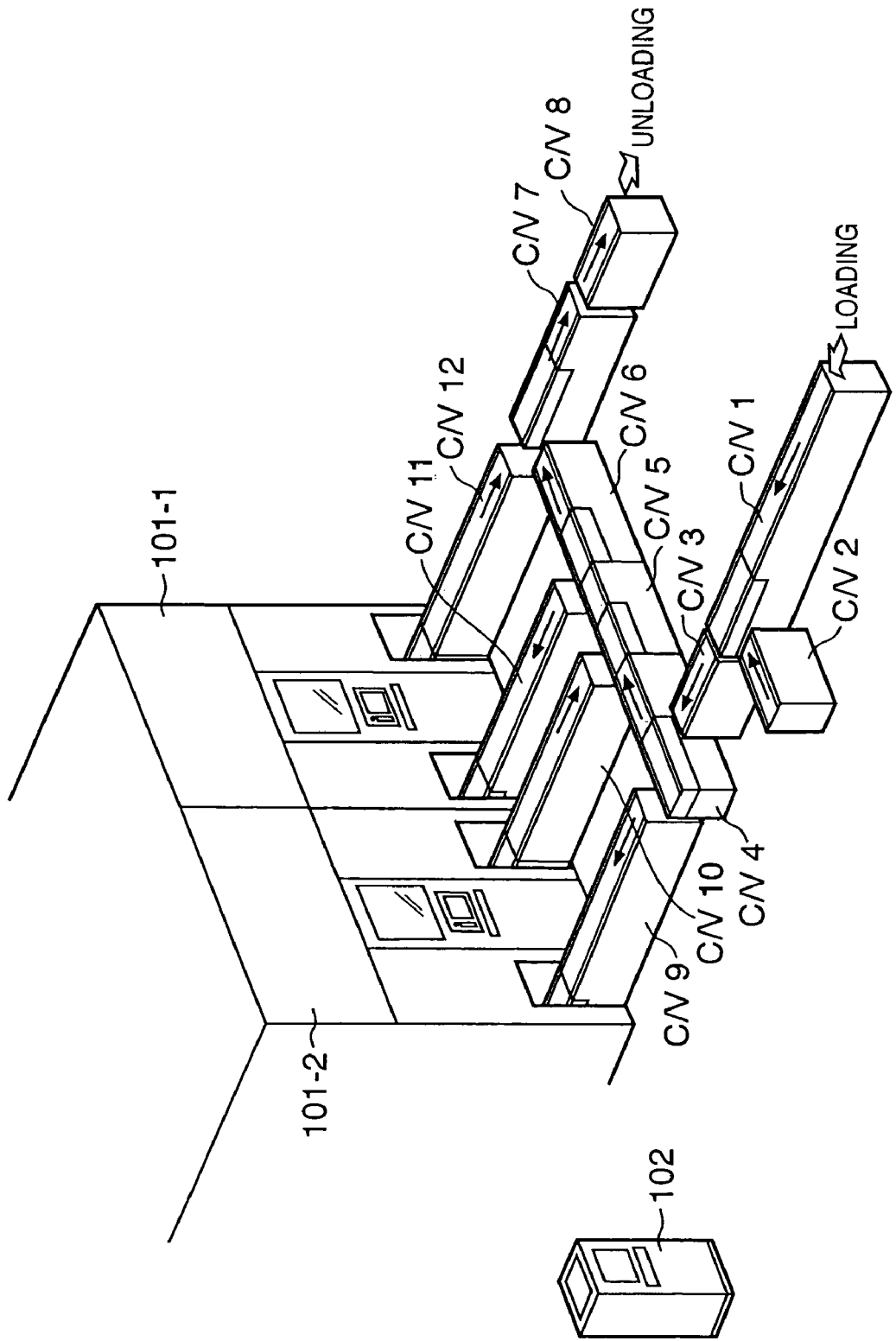
FIG. 1 is a view showing the outer appearance of a convey system to which a layout arranging system according to an embodiment of the present invention is applied.

An outline of a convey system (assembling system) to which a layout arranging system of the present invention is applied will be described first. FIG. 1 shows an example of the outer appearance of the convey system.

Referring to FIG. 1, reference numerals 101-1 and 101-2 denote cabinets 1 and 2 in which conveyance targets (products) are stored; and 102, a controller which manages logistics in the overall convey system. Assume that a layout arranging function according to this embodiment is implemented by the controller 102.

C/V 1 to C/V 12 are convey units (conveyors to be referred to as "C/Vs" hereinafter) that form the convey system. Each C/V conveys a product (not shown) along a predetermined convey route upon receiving a command from the controller 102. A convey route can be set for each product. The controller 102 manages each convey route by causing a reader mounted on part of each convey unit or on the way to it to read product information (e.g., a barcode, ID tag, or IC tag) attached to each product. In this case, an IC tag (wireless IC tag) is a memory device having, in a micro IC chip, an antenna for transmitting/receiving data, and more specifically, a storing device which starts and operates using radio waves with a predetermined frequency transmitted from the reader as operating power, and transmits/receives data.

[2. Outline of Convey Unit]

[2-1] Types and Convey Functions of C/Vs

FIG. 2 is a view showing a list of C/Vs constituting the convey system. Assume that this embodiment uses four types of C/Vs from type A to type D. Referring to FIG. 2, reference numeral 201 denotes the conveying direction of each C/V. Each arrow in FIG. 2 represents the conveying direction of a product (a direction in assembling operation is determined by the conveying direction). Note that type A and type D have turntables 201-1 and 201-2, respectively, and each can rotate the conveying direction of a product through 90° by using the corresponding turntable.

Figure 4:
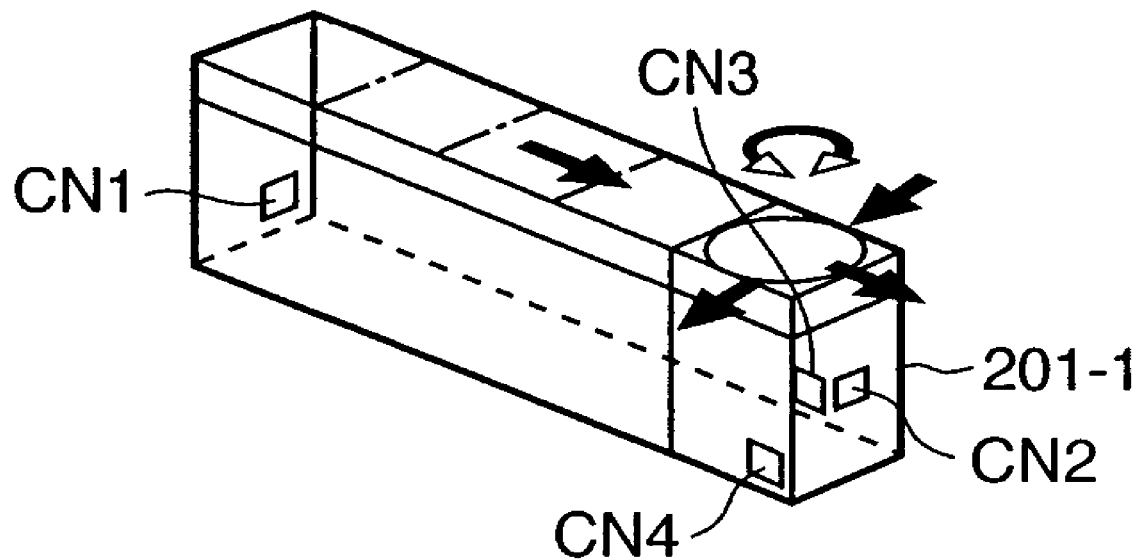
FIG. 4 is a bird's eye view of a C/V (type A) of the convey system.

Reference numeral 202 denotes a connection position at which C/Vs connect to each other. "CN" represents a connection channel. Each C/V has a CN at a place corresponding to a connection position. For reference, FIG. 4 is a bird's eye view of a C/V of type A. The arrows in FIG. 4 correspond to those denoted by reference numeral 201 in FIG. 2. A C/V of type A has four connection positions, and more specifically, one position (CN 1) on the entrance side of the conveying direction of a product, and three positions (CN 2, CN 3, and CN 4) around the turntable 201-1. In this manner, CNs are arranged at places corresponding to connection positions.

Referring back to FIG. 2, reference numeral 203 denotes a convey portion of a C/V of each type. The driving point count of a C/V of each type can be known from the convey portion 203 (as the driving point count increases, the length of a C/V increases, and vice versa). Reference numeral 204 denotes a main use of a C/V of each type.

FIG. 3A is a plan view showing the arrangement of C/Vs of the respective types (A to D) shown in FIG. 2 and the arrangement of cabinets when the convey system shown in FIG. 1 is constructed by using the C/Vs of the respective types. Assembling the C/Vs of the respective types from type A to type D as shown in FIG. 3A makes it possible to construct the convey system shown in FIG. 1.

Figure 3C:
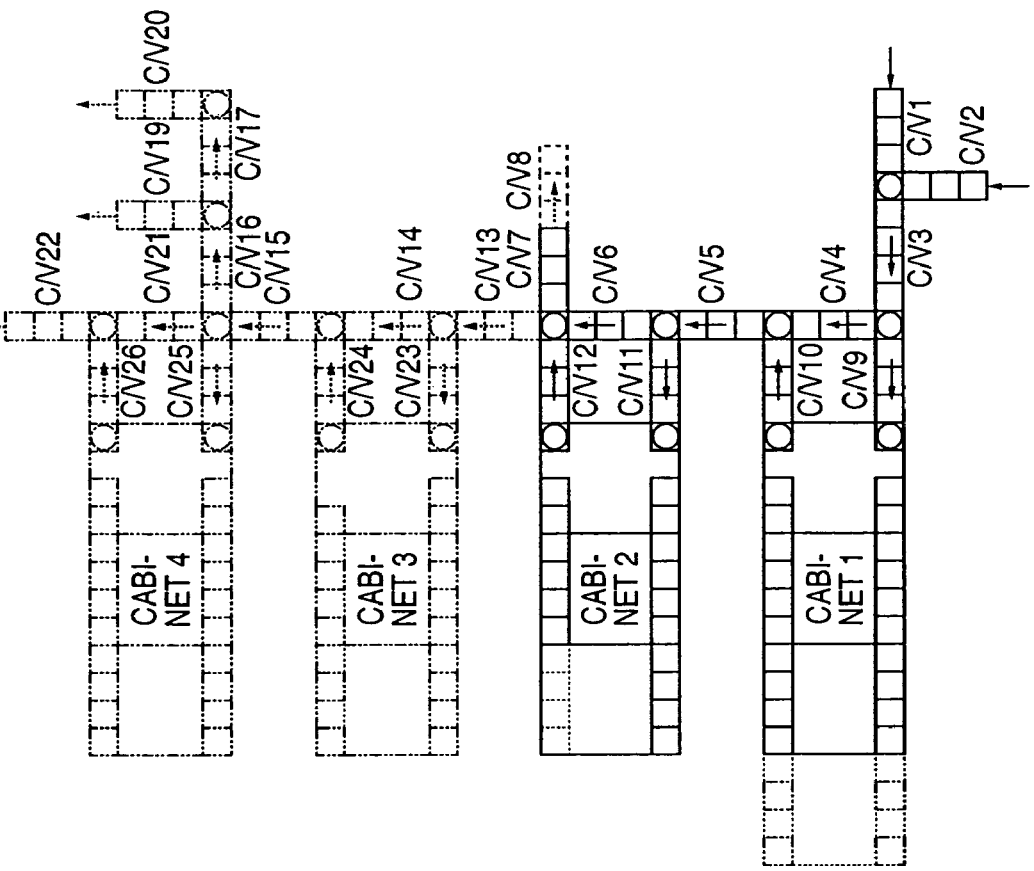
FIG. 3C is a plan view showing an arrangement obtained when the numbers of C/Vs of the respective types, cabinets, shelves in the cabinets, and areas in the cabinets are increased and decreased for each square with respect to the arrangement of the respective types shown in FIG. 3B.
Figure 3B:
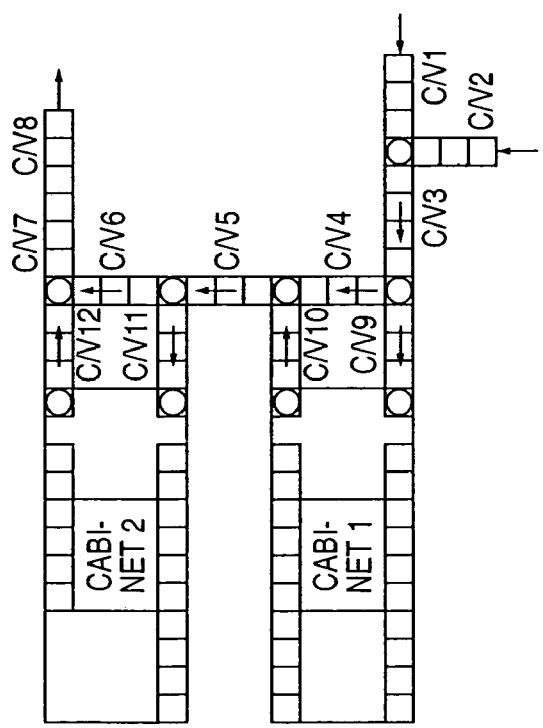
FIG. 3B is a plan view showing in detail the arrangement of the C/Vs of the respective types shown in FIG. 3A and cabinets for each square.

FIG. 3B is a plan view showing the arrangement (existing floor layout) of a C/V of each type shown in FIG. 3A and a cabinet in detail for each square. FIG. 3C is a plan view showing an arrangement (a floor layout after a change) obtained when the numbers of C/Vs of the respective types, cabinets, shelves in the cabinets, and areas in the cabinets are increased and decreased for each square with respect to the arrangement of the respective types shown in FIG. 3B. Even if the number of cabinets, the number of shelves in the cabinets, the number of areas in the cabinets, and the number of C/Vs of the respective types are increased as indicated by the chain double-dashed lines or decreased like the C/V 8 indicated by the dotted lines, a convey system can be easily constructed without any complicated change in program.

[2-2] C/V Connection Method

Figure 5:
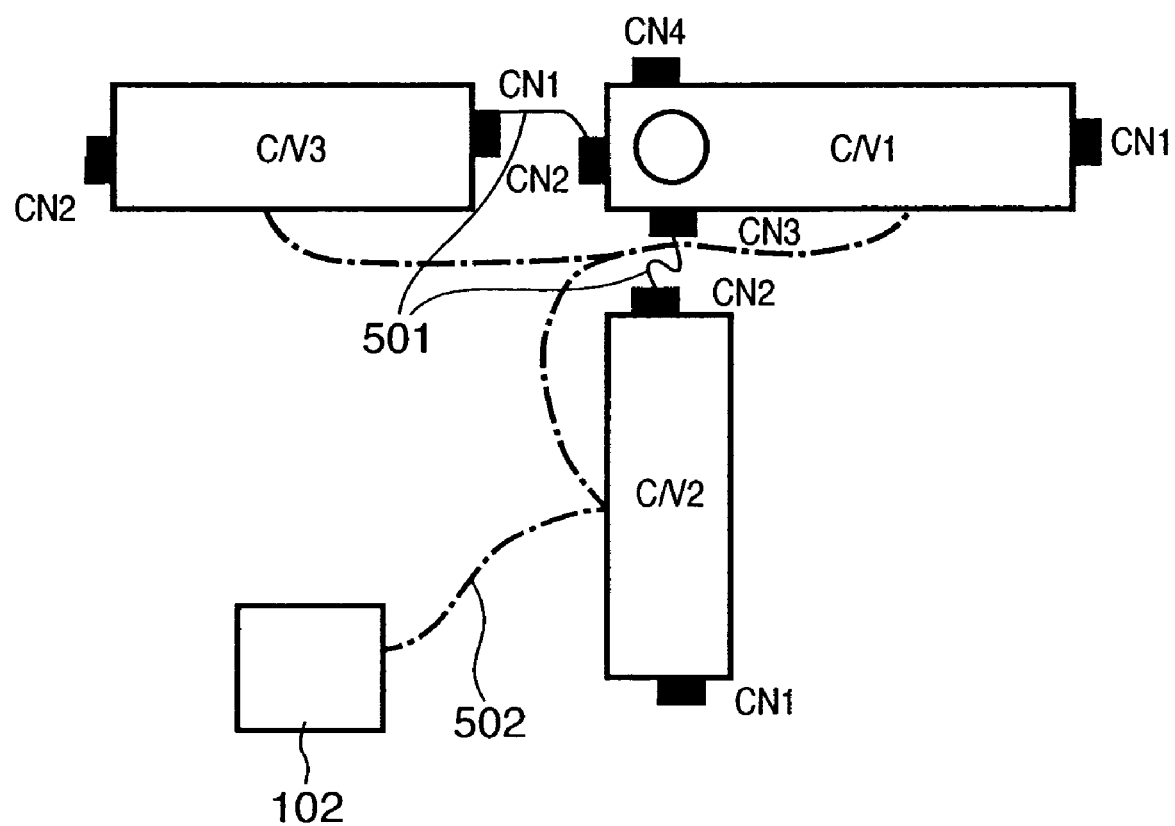
FIG. 5 is a view showing in detail how predetermined C/Vs in the convey system are wired.

FIG. 5 is a view showing in detail how predetermined C/Vs in the convey system are wired. Referring to FIG. 5, the C/V 1 to C/V 3 respectively correspond to the C/V 1 to C/V 3 in FIG. 1 (that is, the C/V 1 is of type A, the C/V 2 is of type C, and the C/V 3 is of type C).

Reference numeral 501 denotes a convey signal line (I/O connection), which connects CNs which the respective C/Vs have in correspondence with connection positions. The controller 102 transmits/receives a connection CN confirmation signal (to be described later) to/from each C/V through the corresponding convey signal line 501 connecting the CNs.

Figure 6:
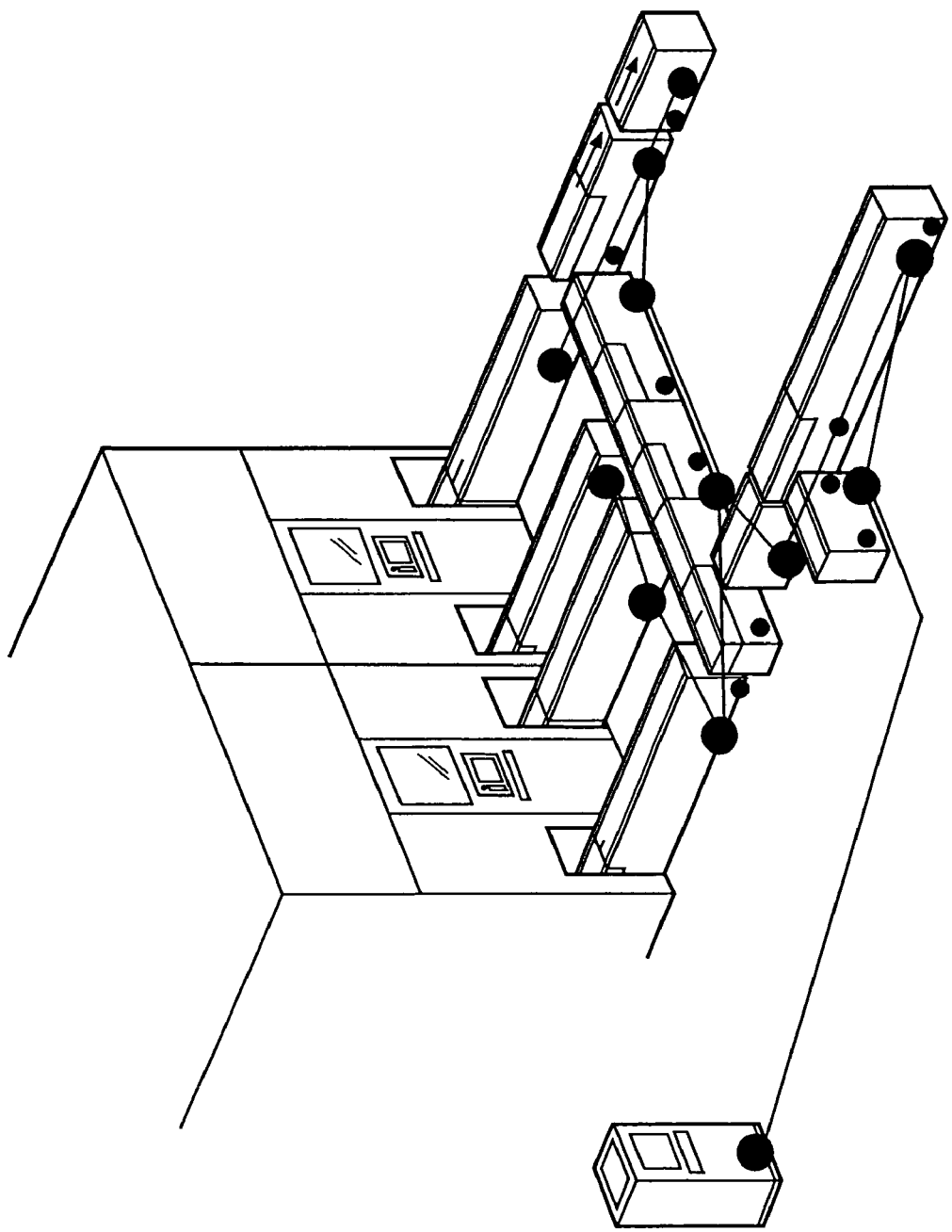
FIG. 6 is a view showing in detail how predetermined C/Vs in the convey system are wired.

Reference numeral 502 denotes an information communication line. CPUs (not shown) incorporated in the respective C/Vs communicate with each other through the information communication line 502. In this embodiment, unique information and connection information are transmitted to the controller 102 through the information communication lines 502. Note that FIG. 6 shows how the information communication lines 502 are arranged in the convey system in FIG. 1. As shown in FIG. 6, the respective C/Vs can be connected either in parallel or in series.

[3. Outline of Layout Arranging System]

Figure 7:
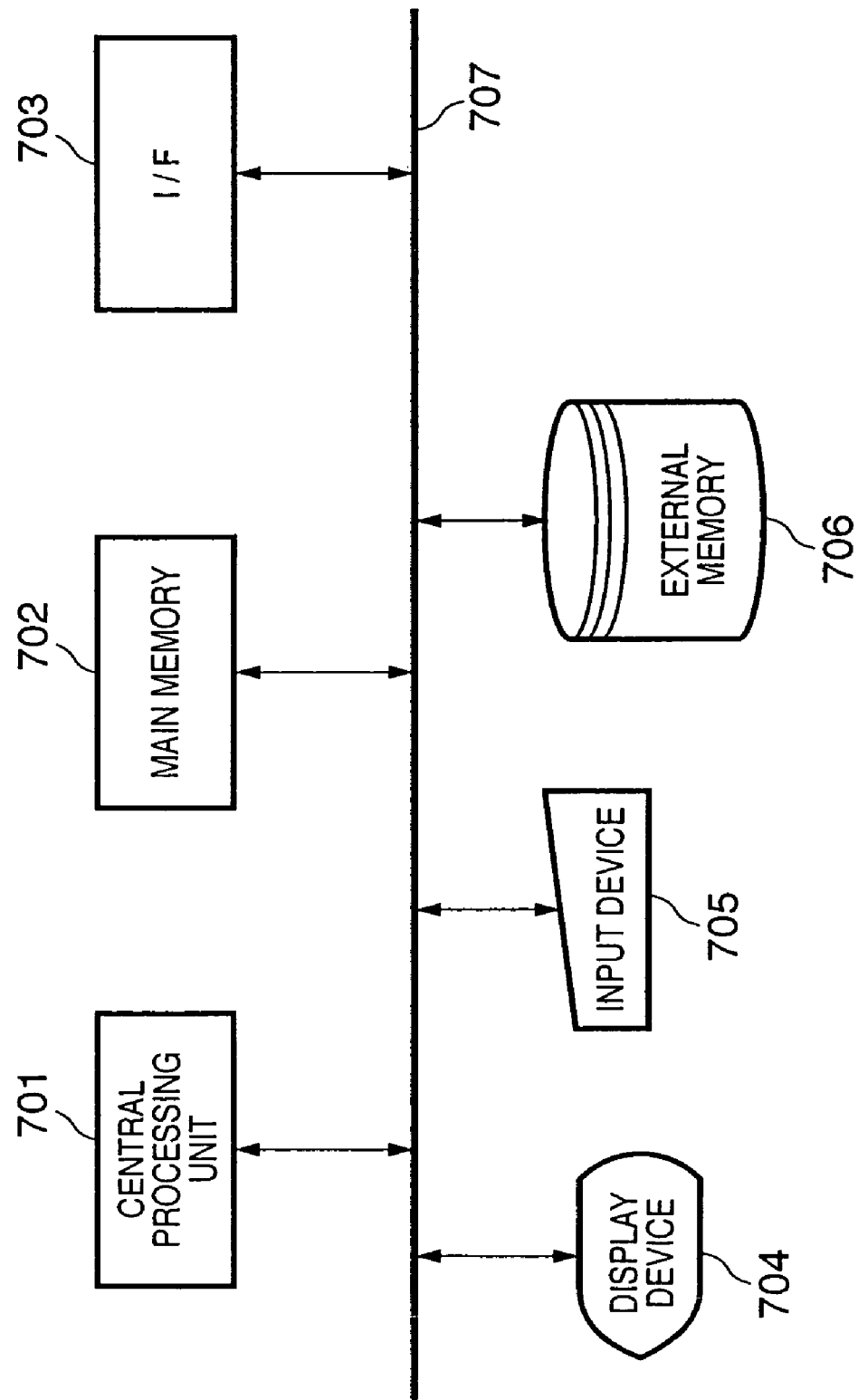
FIG. 7 is a view showing the hardware arrangement of an apparatus which implements a layout arranging method according to an embodiment of the present invention.

FIG. 7 is a view showing the hardware arrangement of an apparatus (the controller 102 in the convey system in this embodiment) which implements the layout arranging method according to this embodiment of the present invention.

Reference numeral 701 denotes a central processing unit (CPU) comprising a microprocessor or the like which executes various kinds of processes to be described later; and 702, a main memory comprising a RAM or the like. The main memory 702 is used to store and execute an operating system (OS) and programs loaded from an external memory 706.

Reference numeral 704 denotes a display device such as a CRT display or liquid crystal display, which is used to display an arranged layout; and 705, an input device such as a keyboard or pointing device, with which the user inputs various kinds of instructions.

Reference numeral 706 denotes an external memory which comprises a storage medium such as a hard disk, magnetooptical disk, or flash memory and is used to store an operating system (OS) and various kinds of application programs.

Reference numeral 707 denotes a bus which is used to exchange data and signals between the above constituent elements (701 to 706); and 703, an interface. Communication with an external unit (e.g., a C/V) or I/O connection is performed through the interface 703.

In the following embodiments including this embodiment, the layout arranging method of the present invention is implemented by causing the central processing unit 702 in the controller 102 of the convey system to execute a control program (to be referred to as a layout arrangement processing program hereinafter) comprising program codes for the respective steps for implementing the layout arranging method according to the present invention. However, the present invention is not limited to this. That is, the present invention may be implemented by an apparatus (layout arranging system) specialized for layout arrangement processing which has the arrangement shown in FIG. 7 or may be implemented by using dedicated hardware instead of performing layout arrangement processing by software as shown in FIG. 7. In this case, the dedicated hardware may be mounted in the controller or independently of the controller.

[4. Functional Blocks of Layout Arranging System]

Figure 8:
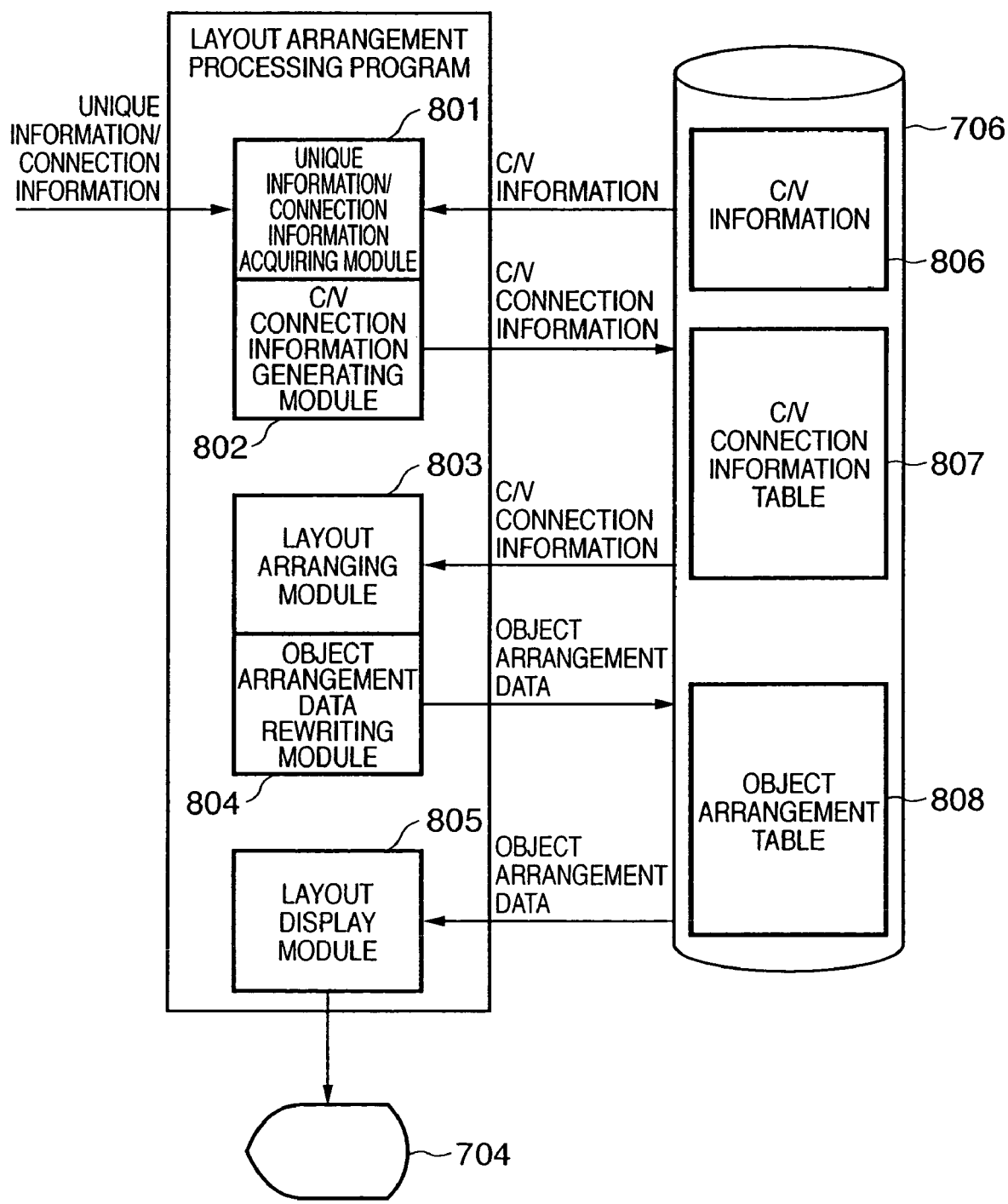
FIG. 8 is a functional block diagram of a layout arrangement processing program according to an embodiment of the present invention.

FIG. 8 is a functional block diagram of a layout arrangement processing program according to an embodiment of the present invention. Referring to FIG. 8, reference numeral 801 denotes a unique information/connection information acquiring module which acquires unique information of each C/V constituting the convey system and connection information indicating how the respective C/Vs are connected to each other (indicating which CN of which C/V is connected to which CN of which C/V) through the information communication line 502 described above. FIG. 10 shows an example of the unique information of a C/V. Assume that the unique information of a C/V includes at least a link node number 1001 and type 1002, as shown in FIG. 10.

The unique information/connection information acquiring module 801 also has a function of reading C/V information 806 stored in the external memory 706 in advance. More specifically, the C/V information 806 is a list of the types of C/Vs constituting the convey system shown in FIG. 2.

Reference numeral 802 denotes a C/V connection information generating module which generates C/V connection information (information concerning an assembled state) necessary for layout arrangement (this operation will be described in detail later). The generated C/V connection information is temporarily stored as a C/V connection information table 807 in the external memory 706.

Reference numeral 803 denotes a layout arranging module which reads out the C/V connection information table 807 stored in the external memory 706 and performs layout arrangement processing. The layout arranged by the layout arranging module 803 is rewritten as object arrangement data by an object arrangement data rewriting module 804. This data is stored as an object arrangement table 808 in the external memory 706.

Reference numeral 805 denotes a layout display module which reads out the object arrangement table 808 stored in the external memory 706 and displays the arranged layout on the display device 704.

[5. Details of Layout Arrangement Processing]

[5-1] Unique Information of C/V

As described above, FIG. 10 is a view showing an example of C/V unique information (identification information concerning a C/V) transmitted from a connected C/V to the controller 102. Referring to FIG. 10, reference numeral 1602 denotes a C/V type, as which one of A to D is written; and 1001, a link node number, which is a number unique to each connected C/V.

[5-2] Unique Information/Connection Information Acquisition Processing

Figure 9:
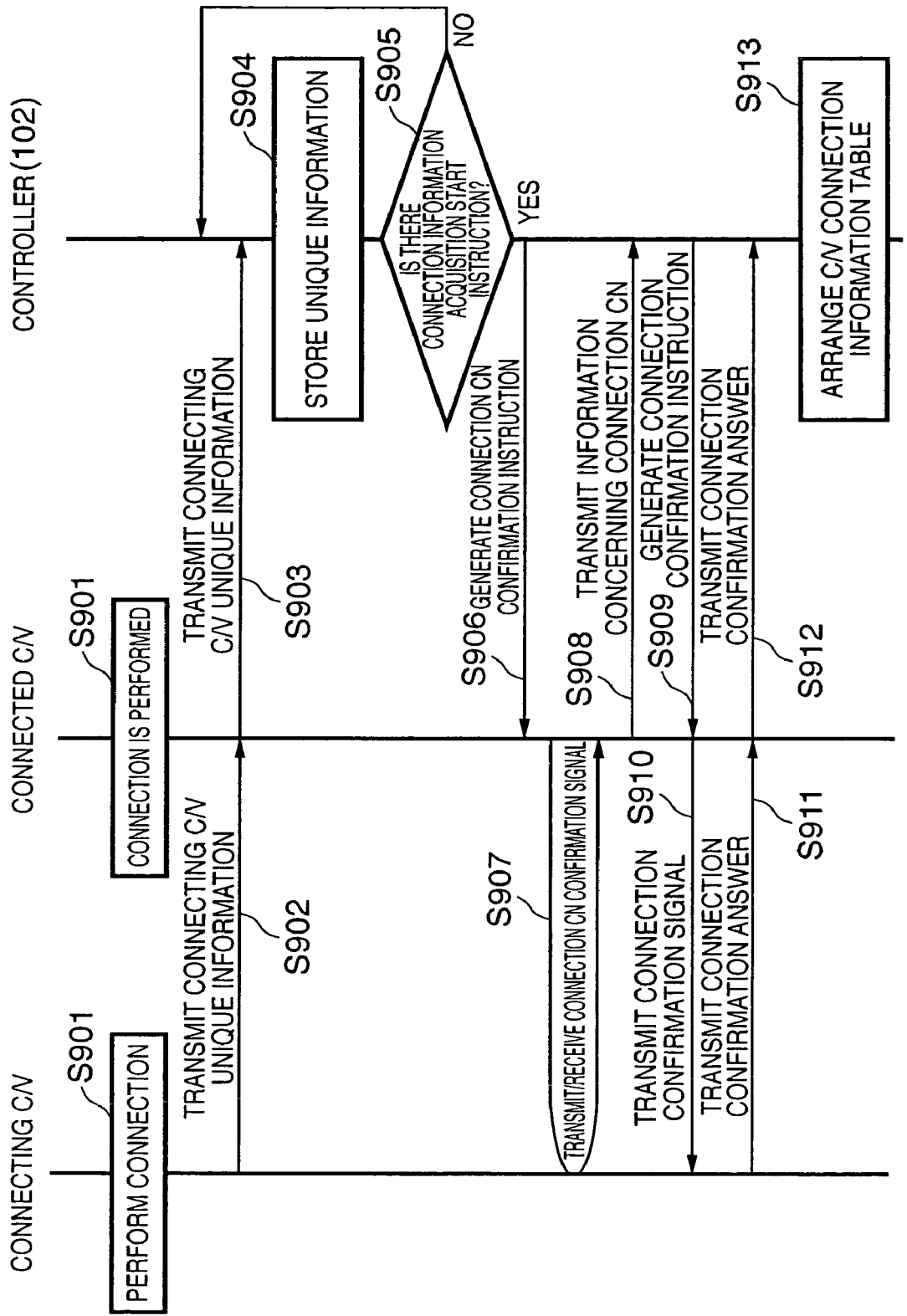
FIG. 9 is a flowchart showing the flow of processing from connection of a C/V and acquisition of unique information/connection information of the C/V.

The flow of processing up to the acquisition of unique information/connection information in the unique information/connection information acquiring module 801 will be described in detail with reference to FIG. 9. Note that in the description of FIG. 9, a C/V to be newly connected will be referred to as a connecting C/V, and a C/V to which the connecting C/V is connected will be referred to as a connected C/V.

In step S901, a connecting C/V (which is a connected C/V from the viewpoint of a connected C/V) is connected to a connected C/V. When the connecting C/V is connected to the connected C/V, the connecting C/V automatically or arbitrarily transmits the unique information of the connecting C/V to the connected C/V (step S902). The connected C/V receives the unique information and transmits it to the controller 102 (step S903).

Figure 11:
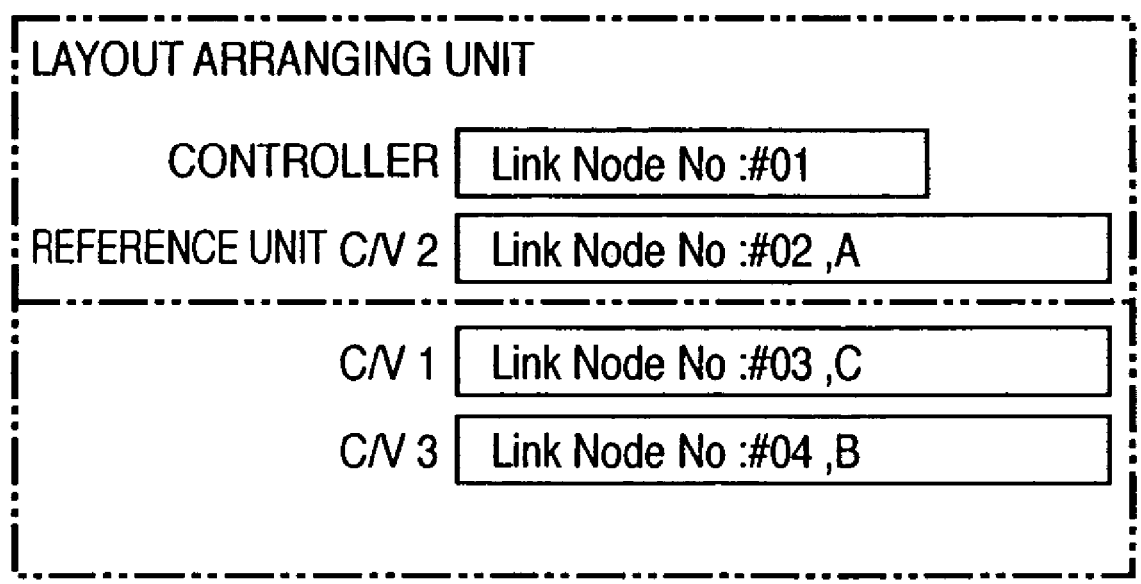
FIG. 11 is a view showing an example of unique information temporarily stored in a layout arranging system according to an embodiment of the present invention.

Upon receiving the unique information, the controller 102 temporarily stores the unique information (step S904). For reference, FIG. 11 shows an example of the temporarily stored unique information. FIG. 11 shows an example of how pieces of unique information are stored when the C/V 2 is connected as a reference unit to a controller with link node number #01, and the C/V 1 and C/V 3 are further connected. As the unique information of the C/V 2, link node number: #02 and type: A are stored; as the unique information of the C/V 1, link node number: #03 and type: C; and as the unique information of the C/V 3, link node number: #04 and type: B.

In step S905, it is monitored whether an instruction to start acquisition of connection information is input. If NO in step S905, the flow returns to step S904. If YES in step S905, the flow advances to step S906 to output the connection CN confirmation instruction through the information communication line. Upon receiving the connection CN confirmation instruction, the connected C/V transmits/receives a connection CN confirmation signal to/from the connecting C/V through the CN (i.e., the convey signal line) (step S907). With this operation, the connected C/V recognizes the connection CN connected to each CN. Information (information concerning a connection position) about the connection CN recognized by the connected C/V is transmitted to the controller 102 through the information communication line (step S908).

Processing from step S906 to step S908 will be concretely described by taking the case shown in FIGS. 5 and 11 (in which the C/V 2, C/V 1, and C/V 3 are connected to the controller 102) as an example. The controller 102 outputs connection CN confirmation instructions to the C/V 2 and C/V 1 as connected C/Vs (the C/V 1 is a connecting C/V in terms of the relationship with the C/V 2, but is a connected C/V in terms of the relationship with the C/V 3). Upon receiving the connection CN confirmation instructions, the C/V 2 and C/V 1 transmit/receive connection CN confirmation signals to/from the C/V 1 and C/V 3, respectively, through the respective CNs using the convey signal lines, thereby recognizing the presence/absence of C/Vs connected to the respective CNs of the C/V 2 and C/V 1. The information about the connection CNs recognized by the C/V 2 and C/V 1 is transmitted to the controller 102 through the information communication lines.

Referring back to FIG. 9, upon receiving the information about the connection CN from each connected C/V, the controller 102 outputs a connection confirmation instruction to each connected C/V (step S909). The connected C/V transmits a connection confirmation signal to the connection CN recognized by the processing in step S907 through the convey signal line (step S910). Upon receiving the connection confirmation signal, the connecting C/V returns a connection confirmation answer (information about the C/V connected at the connection CN) to the controller 102 through the connected C/V using the information communication line (steps S911 and S912). Upon receiving the connection confirmation answer, the controller 102 generates a C/V connection information table (step S913).

The processing from step S909 to step S912 will be concretely described by taking the case shown in FIGS. 5 and 11 as an example. The controller 102 outputs connection confirmation instructions to the connected C/V 2 and C/V 1 through the information communication lines. Upon receiving the connection confirmation instruction, the C/V 2 transmits a connection confirmation signal to the C/V 1 through the CN 2 as a connection CN using the convey signal line. Concurrently upon receiving the connection confirmation instruction from the controller 102, the C/V 1 as a connected C/V transmits a connection confirmation signal to the C/V 3 through the CN 2 as a connection CN using the convey signal line.

Upon receiving the connection confirmation signal from the C/V 2 through the CN 3, the C/V 1 transmits a connection confirmation answer to the controller 102 through the information communication line. Upon receiving the connection confirmation signal through the CN 1 from the C/V 1, the C/V 3 transmits a connection confirmation answer to the controller 102 through the information communication line. The controller 102 receives the connection confirmation answers from the C/V 1 and C/V 3 to formally recognize the connection between the C/V 2 and the C/V 1 and between the C/V 1 and the C/V 3 as connection information.

[5-3] C/V Connection Information Table

FIG. 12 is a view showing an example of the C/V connection information table generated in step S913. Referring to FIG. 12, in fields 1201, items for specifying C/Vs and items for representing the connected states of C/Vs are written. Data ranges 1202 indicate the ranges of data that can be set with respect to the items in the fields 1201. In areas 1203, connected C/Vs are listed. In areas 1204, data with respect to the fields 1201 of the respective C/Vs are stored. Note that items (the fields 1201) to be stored in the C/V connection information table are not limited to those shown in FIG. 12.

[5-4] Layout Arranging/Display Method

Layout arrangement processing to be performed on the basis of a generated C/V connection information table and display processing will be described next. FIG. 13A is a flowchart showing the flow of layout arrangement processing in the controller 102. FIG. 13B is a flowchart showing the flow of layout display processing.

Referring to FIG. 13A, in step S1301, the controller monitors the presence/absence of a layout arranging start instruction. If a layout arranging start instruction is present, the flow advances to step S1302 to read in the already generated C/V connection information table. In step S1303, the controller arranges a layout on the basis of the acquired C/V connection information table. In calculation, the controller refers to the C/V display formulas shown in FIGS. 14A and 14B (FIGS. 14A and 14B are tables in which layout positions based on the connection position relationships between connecting C/Vs and connected C/Vs are written with respect to the respective pieces of C/V connection information written in C/V connection information tables).

In step S1304, the arranged layout is stored as arrangement data.

In addition, as shown in FIG. 13B, in step S1311, the controller monitors whether a layout display instruction is received. If a layout display instruction is received, the flow advances to step S1312 to read in the already stored arrangement data and display the layout on the display-screen (step S1313).

Figure 15:
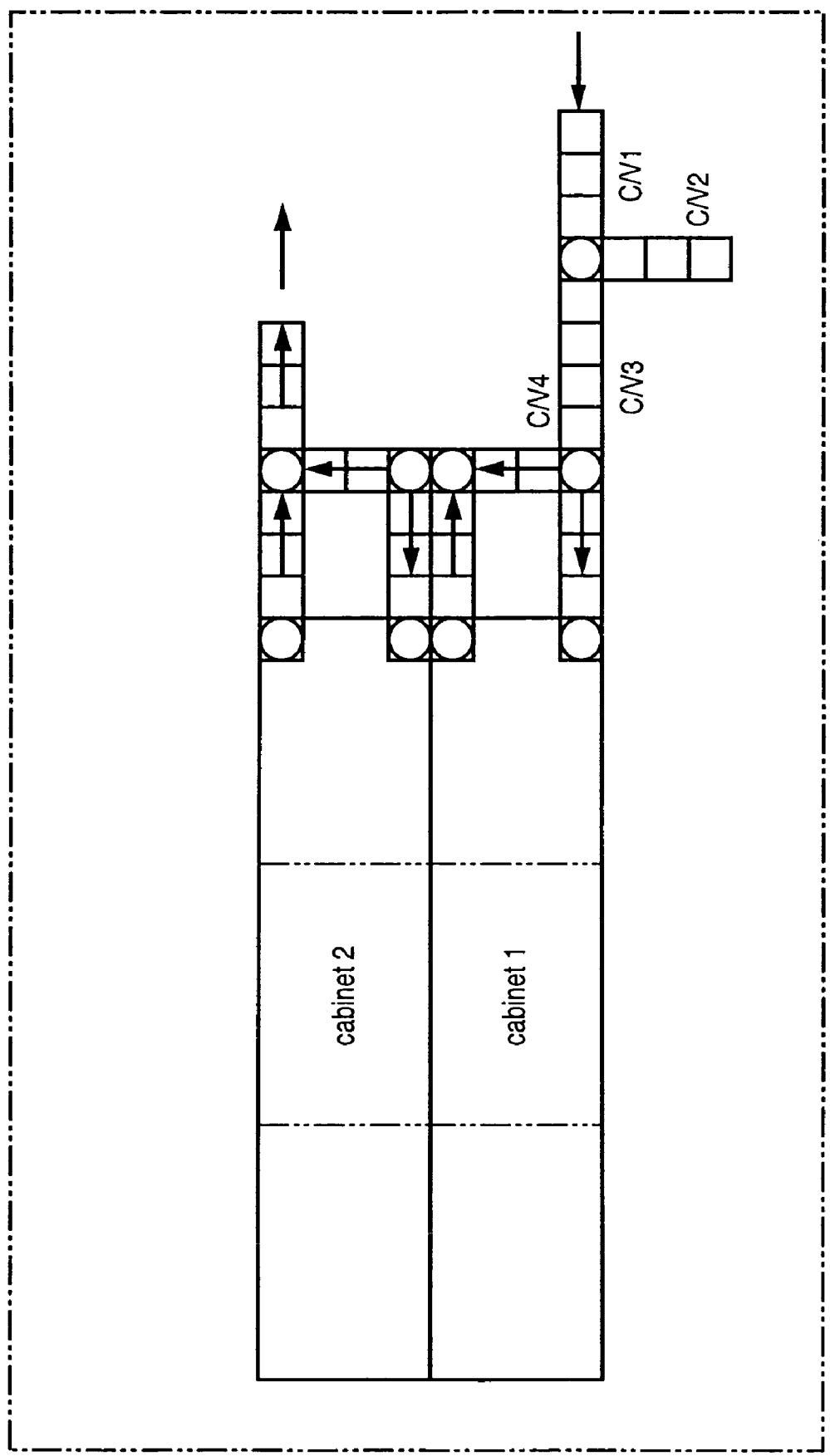
FIG. 15 is a view showing an example of a layout displayed on the display screen of the layout arranging system according to an embodiment of the present invention.

FIG. 15 is a view showing an example of the layout displayed on the display screen by issuing a layout display instruction after issuing a layout arranging start instruction and executing layout arrangement processing. FIG. 15 is a plan view of currently connected C/Vs.

As is obvious from the above description, according to this embodiment, the controller can acquire information necessary for layout arrangement and perform layout arrangement/display by only connecting information communication lines and convey signal lines of the respective C/Vs used for assembly.

[6. Others]

[6-1] Convey Plan Based on Arranged Layout

Figure 16:
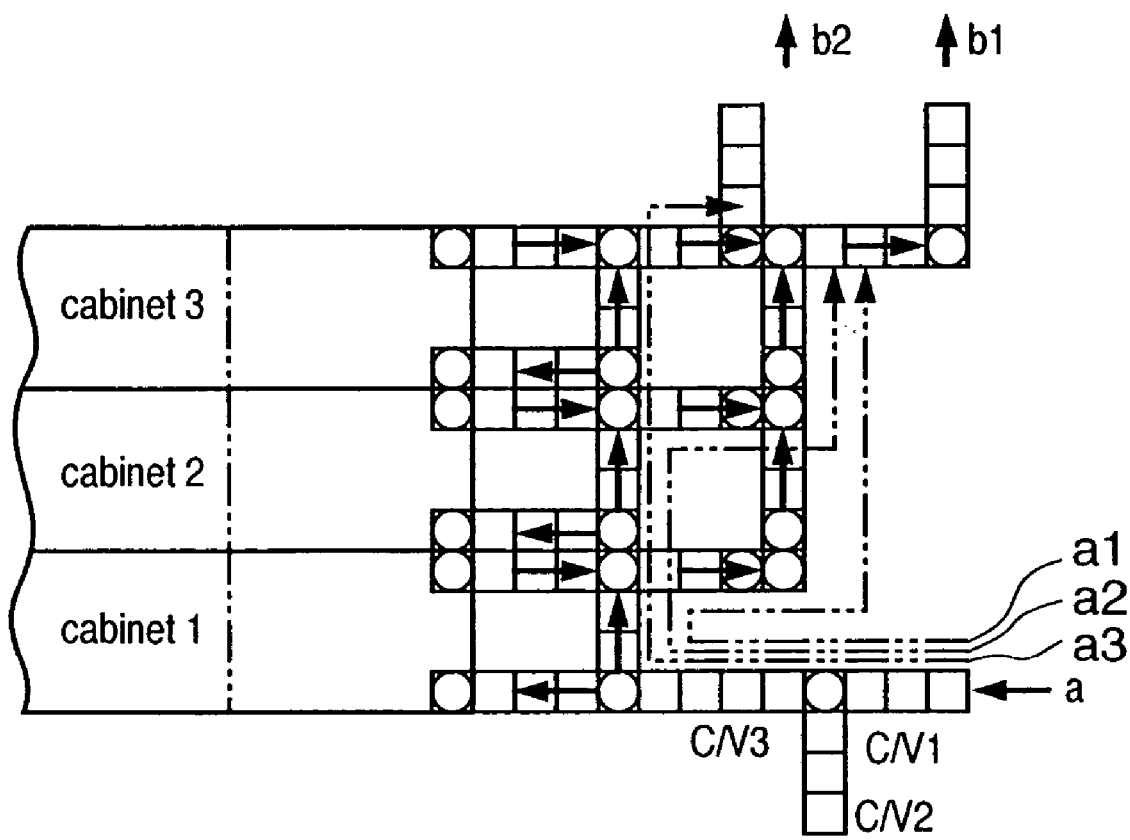
FIG. 16 is a view showing how a conveyance plan is made on the basis of the layout arranged by the layout arrangement processing program according to an embodiment of the present invention.

FIG. 16 is a view showing how a convey plan is made on the basis of the layout arranged by the above layout arrangement processing program. Referring to FIG. 16, routes a1, a2, and a3 are conceivable as routes through which a product is conveyed from a loading portion a to an unloading portion b1. Assuming that each square is counted as one C/V, the numbers of C/Vs used for conveyance from the loading portion a to the unloading portion b1 through the routes a1, a2, and a3 are all 31. It is therefore obvious that this convey system can perform conveyance by using the respective routes in a balanced manner.

When the unloading portion b1 is changed to an unloading portion b2 as shown in FIG. 16, routes a1, a2, and a3 are conceivable as routes through which a product is conveyed from the loading portion a to the unloading portion b2. Assuming that each square is counted as one C/V, the numbers of C/Vs used for conveyance from the loading portion a to the unloading portion b2 through the respective routes are: route a1=28, route a2=28, and route a3=26. Therefore, the shortest route for conveyance from the loading portion a to the unloading portion b2 is the route a3. According to the layout arrangement processing program of this embodiment, since the number of C/Vs for each type stored in the C/V connection information table can be known, the shortest route through which a product is conveyed from the loading portion a to the unloading portion b2 can be recognized.

[6-2] Change in Conveyance Based on Arranged Layout

The layout arrangement processing program according to this embodiment stores the connected state of C/Vs as a C/V connection information table, as described above. By using this connected state, therefore, the route for conveyance of a product can be automatically changed.

Figure 17A:
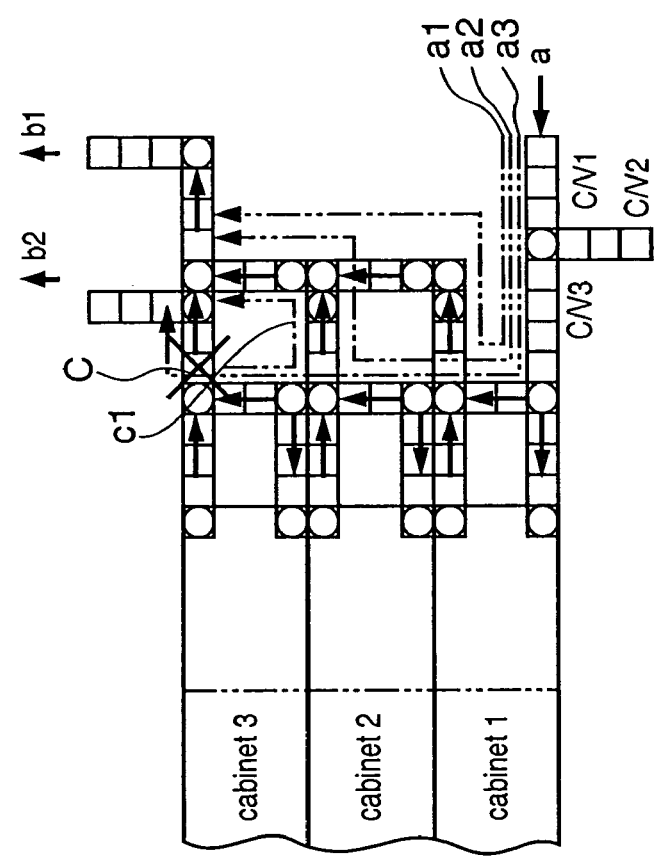
FIGS. 17A and 17B are views showing an example of how a convey route of a product is optimized.
Figure 17B:
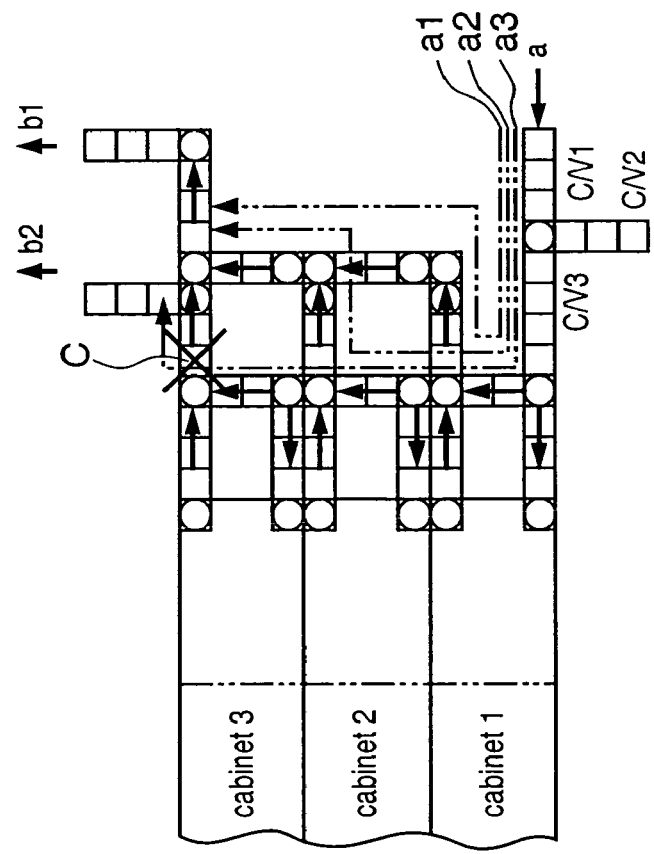

FIGS. 17A and 17B are views showing an example of how the route for conveyance of a product is optimized on the basis of a stored connected state. Referring to FIG. 17A, routes a1, a2, and a3 are conceivable as routes through which a product is conveyed from a loading portion a to an unloading portion b1. A case wherein a conveyance problem has occurred at a portion c in the route a3 during conveyance of the product from the loading portion a to the unloading portion b1 will be described below.

When a trouble occurs at the portion c, the controller 102 can confirm the occurrence of the trouble on the conveyor on the basis of the acquired connected state. As a consequence, the convey route can be automatically changed to perform conveyance by not using the route a3 but by using one of the remaining routes a1 and a2.

Consider unloading operation from a cabinet. Referring to FIG. 17B, when a trouble has occurred at the portion c, if the convey mechanisms of C/Vs in front of the cabinet are of a reversible type, the convey route can be automatically changed to reversely convey the product to the unloading portion b2 through the route c1. This makes it possible to minimize a reduction in productivity due to the occurrence of a trouble in a convey path.

[6-3] Conveyance Display Based on Arranged Layout

The layout arrangement processing program according to this embodiment stores the connected state of C/Vs as a C/V connection information table. Therefore, using this connected state makes it possible to display the conveyance representation of a layout on the display device in association with the actual conveyance position of a product on a convey path in real time.

Referring to FIG. 16, for example, the route a1 is conceivable as a route through which a product is conveyed from the loading portion a to the unloading portion b1. Each C/V communicates C/V information (the existence information of a product) to the controller 102 for each square. The controller 102 generates in advance a program so as to blink/display each C/V as a square on the display device.

A product is then loaded from the loading portion a. The C/V 1 detects that the product exists in the first square (loading portion a) and transmits the existence information of the product to the controller 102. Upon receiving the signal from the C/V 1, the controller 102 blinks a corresponding square (corresponding to the loading portion a) at a corresponding display position (corresponding to the square of the loading portion a) of the layout on the display device on the basis of the received signal. When the C/V 1 transmits, to the controller 102, information indicating that the product has moved to the square next to the loading portion a, the controller 102 blinks the square next to the C/V 1 and blinks off the square of the loading portion a on the display device. Subsequently, repeating displaying/blinking-off operation for each square makes it possible to display the actual conveyance position of a C/V and the actual conveyance position of a product in a layout on the display device in real time. The user can easily know the conveyance state of the convey system by seeing the display state of the display device.

Second Embodiment

The first embodiment has exemplified the case wherein a plan layout is arranged by using a C/V connection information table. The present invention is not limited to this and can be applied to a case wherein a layout in three-dimensional directions is arranged. The second embodiment will exemplify three-dimensional layout arrangement.

Figure 18B:
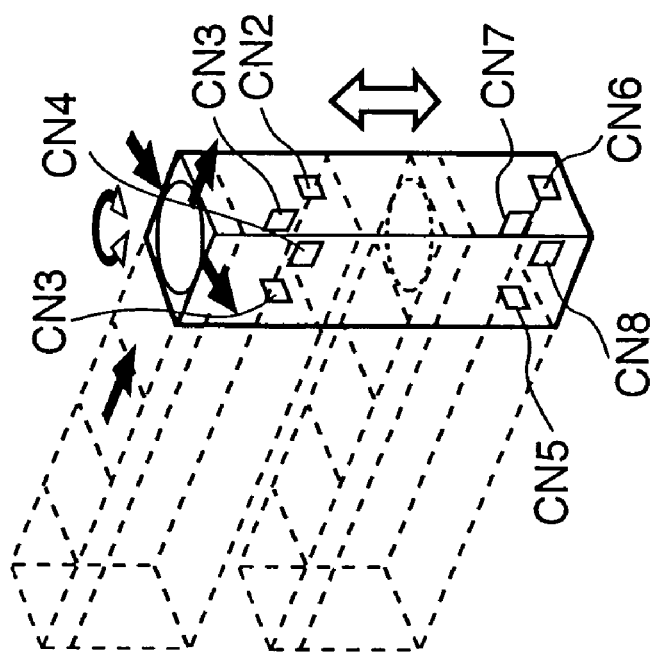
FIGS. 18A and 18B are views showing an example of a C/V which can be connected three-dimensionally.
Figure 18A:
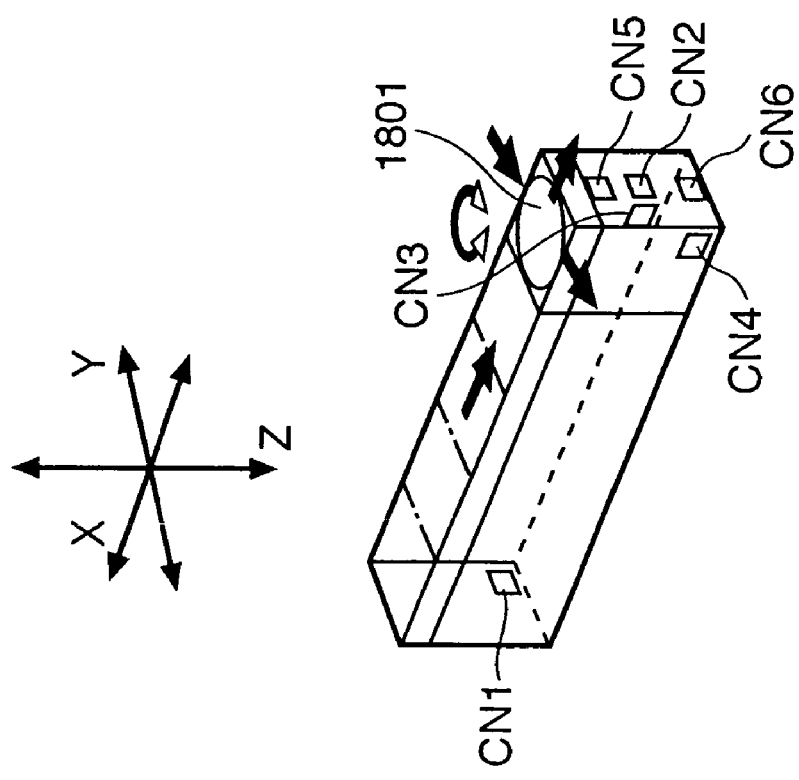

FIG. 18A is a view showing an example of a C/V which can be connected three-dimensionally. The C/V shown in FIG. 18A has six connection positions including one position (CN 1) on the entrance side in the conveying direction of a product and five positions (CN 2 to CN 6) around a turntable 1801. This C/V can be connected to other C/Vs at positions corresponding to the CN positions arranged in this manner. That is, C/Vs can be three-dimensionally connected around the turntable 1801 in five directions, i.e., up, down, left, right, and forward directions.

FIG. 18B shows an example of the state of C/Vs laid out three-dimensionally. As described above, the layout arrangement processing program according to the present invention can be applied to the arrangement of a layout in three-dimensional directions as well as the arrangement of a two-dimensional plan layout.

The assembling unit described in each embodiment has been described as a C/V. However, an assembling unit may be any apparatus which can perform logistics, e.g., a convey apparatus or transfer apparatus (e.g., a transfer machine including a holding head, a slider including a mount portion, or a robot). In addition, C/Vs of type A and type D in FIG. 2 each include one turntable with a rotation angle of 90°. The number of turntables of each C/V may be two, three, or four, and the rotation angle may be 180° or 270°. The number of types of C/Vs may be arbitrarily increased. In addition, each C/V may include an automatic cabinet which stores an object to be conveyed. Furthermore, in each embodiment, for the sake of easy understanding, CNs are provided to indicate directions corresponding to connection positions. However, CNs may be arranged without any limitations as to their positions as long as the CNs can be identified.

Other Embodiment

The object of the present invention is realized even by supplying a storage medium (or recording medium) storing the program codes of the above layout arrangement processing program to a system or apparatus, and causing the computer (or a CPU or MPU) of the system or apparatus to read out and execute the program codes stored in the storage medium. In this case, the program codes read out from the storage medium realize the functions of the above-described embodiments by themselves, and the storage medium storing the program codes constitutes the present invention. The functions of the above-described embodiments are realized not only when the readout program codes are executed by the computer but also when the operating system (OS) running on the computer or the like performs part or all of actual processing on the basis of the instructions of the program codes.

As a storage medium storing such program codes, a floppy (registered trademark) disk, a hard disk, an optical disk, a magnetooptical disk, a CD-ROM, a magnetic tape, a nonvolatile memory card, a ROM, or the like can be used.

The controller 102 performs management by causing a reader mounted on part of each convey unit or on the way to it to read product information (e.g., a barcode, ID tag, or IC tag) attached to each object to be conveyed (product). An object to be conveyed can be conveyed to a target destination on the basis of the product information read by the reader. In addition, processing can be performed by a processing apparatus on the basis of the processing information of product information.

INDUSTRIAL APPLICABILITY

As has been described above, according to the present invention, the layout of a system comprising assembling units can be easily arranged.

The invention claimed is:

1. A conveyance system comprising:
a conveyance line which is configured by connecting any of a plurality of different types of conveyance units to convey objects and a controller which controls said conveyance line, wherein each conveyance unit has a conveyance direction for conveying an object, a connecting position for connecting other conveyance units, and a length, and each type of conveyance unit differs from another type of conveyance unit in terms of one or more of the conveyance direction, the connecting position and the length;
said conveyance units comprising:
identification information transmission means for transmitting identification information based on each type of said conveyance units to said controller,
connecting means, which is arranged on connecting positions of said conveyance units, for connecting one of said conveyance units to another of said conveyance units; and
connection information transmission means for transmitting connection condition information indicating whether the connecting means of a conveyance unit is connected to connecting means of another conveyance unit and the connecting position to said controller, and
said controller comprising:
identification information reception means for receiving the identification information from said conveyance units;
connection information reception means for receiving the information concerning connection condition of said conveyance units, and
layout arranging means for specifying one or more of said conveyance units in the conveyance line, identifying the conveyance direction, the connecting position and the length for each of the specified conveyance units, and arranging a layout of the specified conveyance units, based on the identification information and the information concerning connection condition; and
conveyance plan generating means for generating an optimal route to convey the objects based on the layout arranged by said layout arranging means.

2. The conveyance system according to claim 1, wherein said layout arranging means identifies the length of said conveyance units based on a number of conveyers which are included in each of said conveyance units, each conveyor having the same length, and a length of the conveyer, and
wherein the number of the conveyers and the length of the conveyer are specified based on the type of the conveyance units.

3. The conveyance system according to claim 2, further comprising:
a display device for displaying the layout arranged by said layout arranging means,
wherein said display device displays the conveyer included in each of said conveyance units as a square which forms a predetermined size.

4. The conveyance system according to claim 3, wherein each of said conveyance units comprises existence information transmission means for detecting whether or not an object exists on a conveyer included in each of said conveyance units and transmitting the detected result as existence information of the object to said controller, and
said display device displays the detected result for each conveyer included in each of said conveyance units.

5. The conveyance system according to claim 1, wherein the objects have product information concerning the objects and each of said conveyance units comprises read out means for reading out the product information.

6. The conveyance system according to claim 5, wherein the product information is recorded in any one of a barcode, an ID tag or an IC tag.

7. The conveyance system according to claim 1, wherein said controller further comprises holding means for holding a table for each type of said conveyance units, which defines the conveyance direction for conveying the objects, the connecting position for connecting other conveyance units and the length of said conveyance units.

8. The conveyance system according to claim 2, wherein said convey plan generating means generates the optimum route for conveyance to convey the objects so that the number of the conveyers used for conveying the objects is minimized.

9. The conveyance system according to claim 1, wherein said controller further comprises determination means for determining conveyance units which can convey the objects based on the information concerning connection condition, and
said convey plan generating unit generates the optimum route for conveyance to convey by using conveyance units, other than the conveyance units in which a trouble condition has occurred, for conveying the objects based on the layout of the conveyance line arranged by said layout arranging means.

* * * * *